(12) United States Patent
Guo

(10) Patent No.: US 8,270,746 B2
(45) Date of Patent: Sep. 18, 2012

(54) IMAGE COMPRESSION METHOD AND DEVICE THEREOF

(75) Inventor: Jing-Ming Guo, Taipei County (TW)

(73) Assignee: National Taiwan University of Science and Technology, Taipei (TW)

( * ) Notice: Subject to any disclaimer, the term of this patent is extended or adjusted under 35 U.S.C. 154(b) by 970 days.

(21) Appl. No.: 12/266,569

(22) Filed: Nov. 7, 2008

(65) Prior Publication Data

US 2010/0061647 A1 Mar. 11, 2010

(30) Foreign Application Priority Data

Sep. 8, 2008 (TW) .............................. 97134454 A

(51) Int. Cl.
*G06K 9/00* (2006.01)
(52) U.S. Cl. ........ 382/252; 382/232; 382/233; 382/250; 382/251
(58) Field of Classification Search .................. 382/100, 382/252, 254, 232, 233, 239, 248, 250, 251, 382/253; 358/426.01, 2.1, 1.9, 3.03; 348/384.1, 348/440.1; 375/122
See application file for complete search history.

(56) References Cited

U.S. PATENT DOCUMENTS

| | | | | |
|---|---|---|---|---|
| 6,661,470 | B1 * | 12/2003 | Kawakami et al. | 348/699 |
| 2001/0007595 | A1 * | 7/2001 | Mishima | 382/232 |
| 2007/0047829 | A1 * | 3/2007 | Katougi | 382/237 |
| 2009/0161165 | A1 * | 6/2009 | Fujimoto et al. | 358/2.1 |

OTHER PUBLICATIONS

Article titled "Improved block truncation coding using modified error diffusion" authored by J.-M. Guo, Electronics Letters Mar. 27, 2008 vol. 44 No. 7, pp. 1-2.
Delp et al., "Image Compression Using Block Truncation Coding," IEEE Transactions on Communications COM-27 (9), Sep. 1979, pp. 1335-1342.
Victor Ostromoukhov, "A Simple and Efficient Error-Diffusion Algorithm," SIGGRAPH '01 Proceedings of the 28th annual conference on Computer graphics and interactive techniques, 2001, pp. 567-572.
Guo-Zhen Lian, Digital Image Processing MATLAB, Scholars Books Co., Ltd.: Taipei, 2007, pp. 3-11~3-13, with English translation thereof.
Donald E. Knuth, "Digital Halftones by Dot Diffusion," ACM Transactions on Graphics 6 (4), Oct. 1987, pp. 245-273.
"Office Action of Taiwan counterpart application" issued on Mar. 22, 2012, p. 1-p. 6, in which the listed references were cited.

* cited by examiner

*Primary Examiner* — Ali Bayat
(74) *Attorney, Agent, or Firm* — Jianq Chyun IP Office

(57) ABSTRACT

An image compression method and a device thereof are provided. In the image compression method, a block image having a plurality of pixels is received. In the block image, an adjusted value of a first pixel is compared with a threshold value, and the adjusted value of the first pixel is accordingly quantized as a first parameter value or a second parameter value so as to obtain a quantized value of the first pixel. Next, an error value between the adjusted value of the first pixel and the quantized value of the first pixel is distributed to at least one second pixel adjacent to the first pixel according to an error diffusion kernel. The first pixel and the second pixel are respectively one of the above pixels. Therefore, the quality of the compressed image is improved and the influence of the blocking effect is reduced.

12 Claims, 4 Drawing Sheets

B(0,0) B(0,1)

| $P_{0,0}$ | $P_{0,1}$ | $P_{0,2}$ | $P_{0,3}$ | $P_{0,0}$ | $P_{0,1}$ | $P_{0,2}$ | $P_{0,3}$ |
| $P_{1,0}$ | $P_{1,1}$ | $P_{1,2}$ | $P_{1,3}$ | $P_{1,0}$ | $P_{1,1}$ | $P_{1,2}$ | $P_{1,3}$ |
| $P_{2,0}$ | $P_{2,1}$ | $P_{2,2}$ | $P_{2,3}$ | $P_{2,0}$ | $P_{2,1}$ | $P_{2,2}$ | $P_{2,3}$ |
| $P_{3,0}$ | $P_{3,1}$ | $P_{3,2}$ | $P_{3,3}$ | $P_{3,0}$ | $P_{3,1}$ | $P_{3,2}$ | $P_{3,3}$ |

$$\begin{bmatrix} - & \overset{H_{0,0}}{*} & 7/12 \\ 1/12 & 3/12 & 5/12 \end{bmatrix}$$

310

FIG. 3A $$\begin{bmatrix} - & - & * & 7/48 & 5/48 \\ 3/48 & 5/48 & 7/48 & 5/48 & 3/48 \\ 1/48 & 3/48 & 5/48 & 3/48 & 1/48 \end{bmatrix}$$

320

FIG. 3B $$\begin{bmatrix} - & - & * & 8/42 & 4/42 \\ 2/42 & 4/42 & 8/42 & 4/42 & 2/42 \\ 1/42 & 2/42 & 4/42 & 2/42 & 1/42 \end{bmatrix}$$

IMAGE COMPRESSION METHOD AND DEVICE THEREOF

CROSS-REFERENCE TO RELATED APPLICATION

This application claims the priority benefit of Taiwan application serial no. 97134454, filed on Sep. 8, 2008. The entirety of the above-mentioned patent application is hereby incorporated by reference herein and made a part of this specification.

BACKGROUND OF THE INVENTION

1. Field of the Invention

The present invention relates to an image compression method and a device thereof, in particular, to an image compression method and a device thereof capable of performing block truncation coding (BTC) based on error diffusion.

2. Description of Related Art

Image compression means to reduce the data quantity of a digital image to a degree capable of being supported by a storage or transmission medium. Block truncation coding (BTC) is a low-complexity image compression method Through BTC, an original image is divided into a plurality of nonrepetitive sub-images, and pixels within the sub-images are quantized by statistically extracting the characteristics of the sub-images, so as to reduce the data quantity of the image.

In a typical BTC, the pixel mean value and standard deviation of each sub-image are two key parameters varying with different sub-images to reflect the characteristics of the sub-images. Taking a 4*4 pixel sub-image as an example, if a pixel value in the sub-image is greater than or equal to the pixel mean value, the pixel value is encoded as "1"; otherwise, the pixel value is encoded as "0". "1" and "0" respectively represent two quantized values "a" and "b", and "a" and "b" are correlated with the pixel mean value and standard deviation of the sub-image. Herein, the relations are expressed in equations $a=\bar{x}-\bar{\sigma}\sqrt{q/(m-q)}$ and $b=\bar{x}+\bar{\sigma}\sqrt{(m-q)/q}$. $\bar{x}$ and $\bar{\sigma}$ are respectively the pixel mean value and standard deviation, and m and q are respectively the number of pixels in the sub-image and the number of pixels greater than or equal to the mean value in the sub-image.

Thus, for each sub-image, the image can be reconstructed simply by storing a bit map of 4×4 bits, the pixel mean value, and the standard deviation of the sub-image. In short, in this image compression method, the pixel mean value of each sub-image that the pixels belong to is used as a threshold value to quantize each pixel value as one of the two quantized values. The quantized values are obtained by calculating the pixel mean value and standard deviation of each sub-image that the pixels belong to.

Though the BTC algorithm is less complex than other image compression methods, a large number of add, multiply, and square-root operations are still required for calculating the pixel mean value and standard deviation of each sub-image. Moreover, even if different sizes of sub-images can be designed by BTC to control the image compression ratio, the quality of the compressed image is deteriorated with the rising of the compression ratio, and a blocking effect may even occur. The blocking effect refers to a discontinuous phenomenon between two adjacent sub-images. Since each sub-image takes its pixel mean value as a basis for reconstructing the image, the image after compression becomes more and more blurring with the increase of the size of the sub-image, such that the human eyes may not perceive the characteristics of the original image, for example, resulting in a false contour.

SUMMARY OF THE INVENTION

Accordingly, the present invention is directed to an image compression method and a device thereof, which have the advantages of low complexity, high compression ratio, and high image quality. Moreover, the images compressed by the present invention also accord with the low-pass characteristics of human eyes.

An image compression method is provided. The method includes the following steps. First, a block image having a plurality of pixels is received. Next, an adjusted value of a first pixel is compared with a threshold value, and the adjusted value of the first pixel is accordingly quantized as a first parameter value or a second parameter value so as to obtain a quantized value of the first pixel. Afterward, an error value between the adjusted value of the first pixel and the quantized value of the first pixel is distributed to at least one second pixel adjacent to the first pixel according to an error diffusion kernel, so as to generate an adjusted value of the second pixel. The first pixel and the second pixel are respectively one of the above pixels.

An image compression device including a capturing module, a quantization module, and an error diffusion module is also provided. The capturing module is used for receiving a block image having a plurality of pixels. The quantization module is coupled to the capturing module, for comparing an adjusted value of a first pixel with a threshold value and quantizing the adjusted value of the first pixel as a first parameter value or a second parameter value according to a comparison result so as to obtain a quantized value of the first pixel. The error diffusion module is coupled to the quantization module, for distributing an error value between the adjusted value of the first pixel and the quantized value of the first pixel to at least one second pixel adjacent to the first pixel according to an error diffusion kernel so as to generate an adjusted value of the second pixel. The first pixel and the second pixel are respectively one of the above pixels.

In an embodiment of the image compression method and the device thereof, the threshold value is a mean value of the pixels within the block image.

In an embodiment of the image compression method and the device thereof, the first parameter value is a maximum value of the pixels within the block image, and the second parameter value is a minimum value of the pixels within the block image.

In the present invention, according to characteristics of the block image that the pixels belong to, the adjusted value of each pixel is quantized as a first parameter value or a second parameter value, so as to reduce the data quantity of the compressed image. Moreover, the error value of each pixel before and after quantization is distributed to adjacent pixels, so as to maintain the average hue of the block image that the pixels belong to and reduce the influence of the blocking effect, thereby improving the quality of the compressed image.

In order to make the aforementioned and other objectives, features, and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a schematic view of an image according to an embodiment of the present invention.

FIGS. 3A to 3C show error diffusion kernels according to an embodiment of the present invention.

DESCRIPTION OF THE EMBODIMENTS

Figure 1:
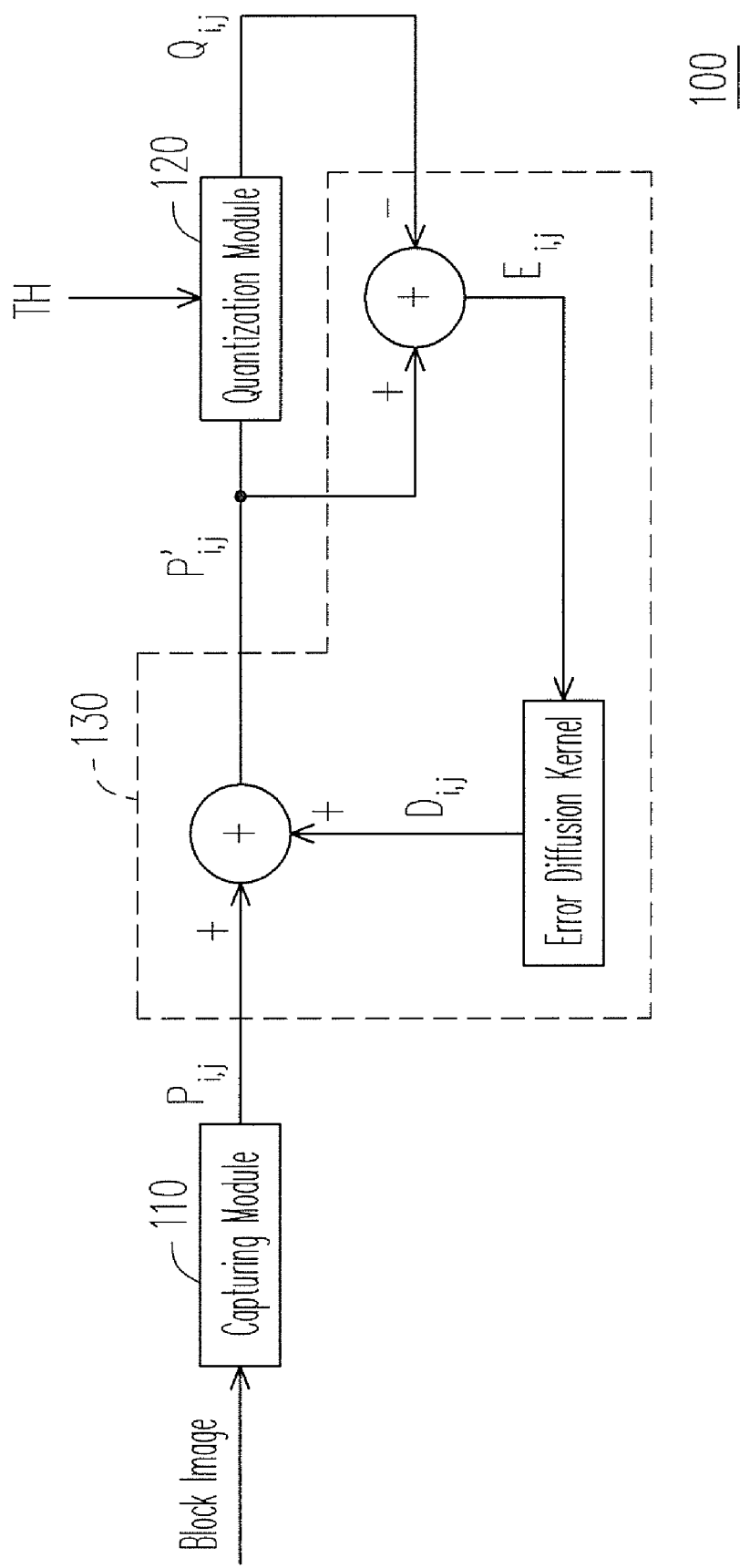
FIG. 1 is a schematic view of an image compression device according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic view of an image compression device according to an embodiment of the present invention. Referring to FIG. 1, an image compression device 100 includes a capturing module 110, a quantization module 120, and an error diffusion module 130. The capturing module 110 is used for receiving a block image. Referring to FIG. 2, an image 200 can be divided into a plurality of non-repeated block images B(X,Y), for example, block images B(0,0) and B(0,1). Each block image has M×N pixels, for example, M=4 and N=4. For the ease of illustration, the values of the pixels within the block images are donated by $P_{i,j}$, where $0 \leq i \leq M-1$ and $0 \leq j \leq N-1$.

The quantization module 120 is coupled to the capturing module 110 for analyzing the mean value of the pixels in each block image B(X,Y), and the mean value serves as a threshold value $TH_{B(X,Y)}$. Then, the quantization module 120 compares an adjusted value $P'_{i,j}$ of each pixel with the threshold value $TH_{B(X,Y)}$, and accordingly quantizes the adjusted value $P'_{i,j}$ of the pixel as a first parameter value or a second parameter value so as to obtain a quantized value $Q_{i,j}$ of the pixel. The adjusted value $P'_{i,j}$ of the pixel is obtained after being processed by the error diffusion module 130, and the details will be described below. If the adjusted value $P'_{i,j}$ of the pixel is greater than or equal to the threshold value $TH_{B(X,Y)}$, the quantization module 120 quantizes the adjusted value $P'_{i,j}$ of the pixel as the first parameter value. On the contrary, if the adjusted value $P'_{i,j}$ of the pixel is smaller than the threshold value $TH_{B(X,Y)}$, the quantization module 120 quantizes the adjusted value $P'_{i,j}$ of the pixel as the second parameter value. Herein, the first parameter value is the maximum value $P_{max}$ of the pixels within the block image B(X,Y), and the second parameter value is the minimum value $P_{max}$ of the pixels within the block image B(X,Y). The threshold value $TH_{B(X,Y)}$ and the quantized value $Q_{i,j}$ of the pixel are expressed by the following equations:

$$TH_{B(X,Y)} = \frac{1}{M \times N} \times \sum_{i=0}^{M-1} \sum_{j=0}^{N-1} P_{i,j}$$

and $$Q_{i,j} = \begin{cases} P_{maz}, & P'_{i,j} \geq TH_{B(X,Y)} \\ P_{min}, & P'_{i,j} < TH_{B(X,Y)} \end{cases}.$$

In this embodiment, since the adjusted value $P'_{i,j}$ of the pixel is quantized as the first parameter value or the second parameter value through block truncation coding (BTC), an error may be incurred to the pixel before and after quantization. Based on the fact that adjacent pixels within the block image are generally highly correlated, the error diffusion module 130 distributes an error value $E_{i,j}$ of the pixel before and after quantization to adjacent pixels according to an error diffusion kernel, so as to eliminate the blocking effect and maintain the average hue of each block. The error value $E_{i,j}$ is a difference between the adjusted value $P'_{i,j}$ and the quantized value $Q_{i,j}$ of the pixel.

FIGS. 3A, 3B, and 3C respectively show error diffusion kernels according to an embodiment of the present invention. Referring to FIGS. 3A, 3B, and 3C, error diffusion kernels 310, 320, and 330 are respectively a Floyd diffusion kernel, a Jarvis diffusion kernel, and a Stucki diffusion kernel. In the error diffusion kernels 310, 320, and 330, an element donated by "*" is corresponding to a pixel currently being quantized in the block image B(X,Y), and the error value $E_{i,j}$ of the pixel before and after quantization is distributed to adjacent pixels. In addition, in the error diffusion kernel 310, an element donated by "−" is corresponding to a pixel that has been quantized, such that no error diffusion needs to be performed on the pixel. For the ease of illustration, the error diffusion kernel 310 is taken as an example, and elements within the error diffusion kernel 310 are donated by $H_{q,r}$, where $0 \leq q \leq 1$ and $-1 \leq r \leq 1$.

The error diffusion module 130 takes a value obtained by multiplying the error value $E_{i,j}$ of the pixel before and after quantization by the element $H_{q,r}$ as a reference for adjusting the pixel value $P_{i+q,j+r}$ according to the error diffusion kernel 310. That is, the values obtained by respectively multiplying the error values $E_{i,j}$ of the pixel before and after quantization by 7/12, 1/12, 3/12, and 5/12 are used to adjust the pixel values $P_{i,j+1}$, $P_{i+1,j-1}$, $P_{i+1,j}$, and $P_{i+1,j+1}$ according to the error diffusion kernel 310. In other words, the diffused value $D_{i,j}$ obtained from adjacent pixels by the pixel value $P_{i,j}$ through error diffusion is $E_{i,j-1} \times H_{0,1} + E_{i-1,j+1} \times H_{1,-1} + E_{i-1,j} \times H_{1,0} + E_{i-1,j-1} \times H_{1,1}$ according to the error diffusion kernel 310. The diffused value $D_{i,j}$ and the adjusted value $P_{i,j}$ of the pixel are expressed by the following equations:

$$D_{i,j} = \sum_{q=0}^{1} \sum_{r=-1}^{1} E_{i-q,j-r} \times H_{q,r}$$

and $$P'_{i,j} = P_{i,j} + D_{i,j}.$$

Similarly, analogies can also be drawn to the error diffusion kernels 320 and 330. It is noted that although the said embodiment takes the Floyd diffusion kernel 310 as an example to distribute quantization error to the adjacent pixels, people ordinarily skilled in the art can utilize other error diffusion kernels to practice the said embodiment, and the present invention is not limited to the said embodiment. In addition, the distribution range where the adjacent pixels are contained and the distribution weights of the adjacent pixels may be adapted to the algorithm and the architecture design so that the present invention is not limited thereto.

Figure 4:
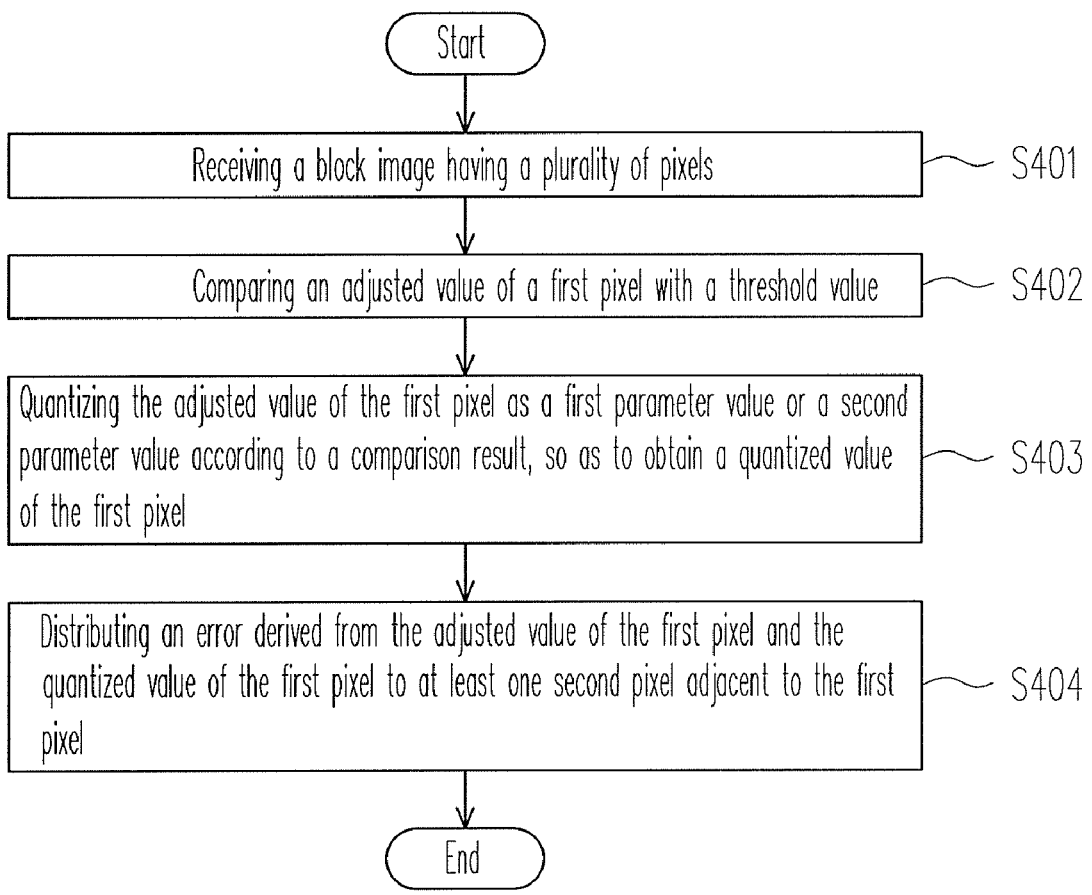
FIG. 4 is a flow chart of an image compression method according to an embodiment of the present invention.

Herein, the description of the above embodiment is concluded into a flow chart of the method as follows. FIG. 4 is a flow chart of an image compression method according to an embodiment of the present invention. Referring to FIG. 4, first, a block image having a plurality of pixels is received (Step S401). Next, an adjusted value of a first pixel is compared with a threshold value (Step S402), and the adjusted value of the first pixel is quantized as a first parameter value or a second parameter value according to a comparison result so as to obtain a quantized value of the first pixel (Step S403). The first pixel is one of the above pixels. Afterward, an error value between the adjusted value of the first pixel and the quantized value of the first pixel is distributed to at least one second pixel adjacent to the first pixel, so as to generate an adjusted value of the second pixel (Step S404). The second pixel is one of the above pixels.

To sum up, in the above embodiment, the mean value of the pixels in the block image is used as the threshold value for quantizing the adjusted value of each pixel as the first parameter value or the second parameter value. In order to effectively reduce the complexity and the quantity of operation of image compression, the first parameter value and the second parameter value are respectively the maximum value and the minimum value of the pixels in the block image. In addition, errors may be incurred in the process of pixel quantization, such that the human eyes can easily perceive the differences between the compressed image and the original image. Thereby, the error value of each pixel before and after quantization is distributed to adjacent pixels in the above embodiment, so as to compensate through the adjacent pixels. In this manner, not only the average hue of the block image that the pixels belong to is maintained, but also the influence of the blocking effect is greatly reduced. As a result, the quality of the compressed image is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image compression method, comprising:
   receiving a block image, wherein the block image has a plurality of pixels;
   comparing a threshold value with an adjusted value of a first pixel, wherein the first pixel is one of the pixels;
   quantizing the adjusted value of the first pixel as a first parameter value or a second parameter value according to a comparison result of the first pixel, so as to obtain a quantized value of the first pixel; and
   distributing an error value between the adjusted value of the first pixel and the quantized value of the first pixel to at least one second pixel adjacent to the first pixel according to an error diffusion kernel, so as to generate an adjusted value of the second pixel, wherein the second pixel is one of the pixels, wherein the first parameter value is a maximum value of the pixels within the block image, and the second parameter value is a minimum value of the pixels within the block image.

2. The image compression method according to claim 1, wherein the step of quantizing the adjusted value of the first pixel as the first parameter value or the second parameter value according to the comparison result of the first pixel comprises:
   quantizing the adjusted value of the first pixel as the first parameter value when the value of the first pixel is greater than or equal to the threshold value; and
   quantizing the adjusted value of the first pixel as the second parameter value when the value of the first pixel is smaller than the threshold value.

3. The image compression method according to claim 1, wherein the threshold value is a mean value of the pixels within the block image.

4. The image compression method according to claim 1, wherein the error diffusion kernel is a Floyd diffusion kernel.

5. The image compression method according to claim 1, wherein the error diffusion kernel is a Jarvis diffusion kernel.

6. The image compression method according to claim 1, wherein the error diffusion kernel is a Stucki diffusion kernel.

7. An image compression device, comprising:
   a capturing module, for receiving a block image, wherein the block image has a plurality of pixels;
   a quantization module, coupled to the capturing module, for comparing a threshold value with an adjusted value of a first pixel and accordingly quantizing the adjusted value of the first pixel as a first parameter value or a second parameter value so as to obtain a quantized value of the first pixel, wherein the first pixel is one of the pixels; and
   an error diffusion module, coupled to the quantization module, for distributing an error value between the adjusted value of the first pixel and the quantized value of the first pixel to at least one second pixel adjacent to the first pixel according to an error diffusion kernel so as to generate an adjusted value of the second pixel, wherein the second pixel is one of the pixels, wherein the first Parameter value is a maximum value of the pixels within the block image, and the second parameter value is a minimum value of the pixels within the block image.

8. The image compression device according to claim 7, wherein when the value of the first pixel is greater than or equal to the threshold value, the quantization module quantizes the value of the first pixel as the first parameter value; and when the value of the first pixel is smaller than the threshold value, the quantization module quantizes the adjusted value of the first pixel as the second parameter value.

9. The image compression device according to claim 7, wherein the threshold value is a mean value of the pixels within the block image.

10. The image compression device according to claim 7, wherein the error diffusion kernel is a Floyd diffusion kernel.

11. The image compression device according to claim 7, wherein the error diffusion kernel is a Jarvis diffusion kernel.

12. The image compression device according to claim 7, wherein the error diffusion kernel is a Stucki diffusion kernel.

* * * * *